(12) United States Patent
Drake et al.

(10) Patent No.: US 8,882,175 B2
(45) Date of Patent: Nov. 11, 2014

(54) VEHICLE, A DOOR ASSEMBLY FOR THE VEHICLE AND A METHOD OF ASSEMBLING THE DOOR ASSEMBLY

(71) Applicant: GM Global Technology Operations LLC, Detroit, MI (US)

(72) Inventors: Brian D. Drake, Troy, MI (US); Mark A. Beauregard, Clarkston, MI (US); Matthew M. Kunz, Washington, MI (US); James R. Roll, Ann Arbor, MI (US); Darren M. Van Houzen, Royal Oak, MI (US); Raymond Lyszczarz, Oxford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/633,941

(22) Filed: Oct. 3, 2012

(65) Prior Publication Data

US 2014/0090304 A1    Apr. 3, 2014

(51) Int. Cl.
*B60J 5/04*    (2006.01)

(52) U.S. Cl.
USPC .................................... 296/146.9; 296/146.5

(58) Field of Classification Search
CPC ....... B60J 5/0402; B60J 5/0405; B60J 5/0406
USPC ........... 296/146.5, 146.9, 146.2, 1.08; 49/502
See application file for complete search history.

(56) References Cited

U.S. PATENT DOCUMENTS 7,900,993 B2 *    3/2011    Suzuki et al. .............. 296/146.5
8,151,520 B2 *    4/2012    Yamashita et al. .............. 49/502

* cited by examiner

*Primary Examiner* — Joseph D Pape
(74) *Attorney, Agent, or Firm* — Quinn Law Group, PLLC

(57) ABSTRACT

A vehicle, a door assembly for the vehicle and a method of assembling the door assembly are disclosed. A first component includes a first alignment member and a second component is attached to the first component. The second component includes first and second ends spaced along a first axis, and includes first and second side edges spaced along a second axis transverse to the first axis. A trim strip extending to a distal edge, with the second component coupled to the trim strip. A second alignment member attached to the trim strip, with the alignment members engaging each other to attach the trim strip to the first component and orientate the distal edge of the trim strip relative to the first axis such that the distal edge of the trim strip and one of the side edges of the second component substantially align with each other along the first axis.

16 Claims, 5 Drawing Sheets

VEHICLE, A DOOR ASSEMBLY FOR THE VEHICLE AND A METHOD OF ASSEMBLING THE DOOR ASSEMBLY

TECHNICAL FIELD

The present disclosure relates to a vehicle, a door assembly for the vehicle and a method of assembling the door assembly of the vehicle.

BACKGROUND

Various vehicles have doors for entering or exiting a vehicle compartment. Weather strips or trim pieces have been designed to cover edges of the doors or edges of the vehicle compartment. These weather strips or trim pieces can be visible from outside of the vehicle which can provide challenges to presenting an aesthetic appearance of the vehicles.

SUMMARY

The present disclosure provides a door assembly for a vehicle including a first component. The first component includes a first alignment member. The door assembly also includes a second component attached to the first component. The second component includes a first end and a second end spaced from each other along a first axis. The second component also includes a first side edge and a second side edge spaced from each other along a second axis transverse to the first axis. The door assembly further includes a trim strip extending to a distal edge, with the second component coupled to the trim strip. The door assembly further includes a second alignment member attached to the trim strip. The first and second alignment members engage each other to attach the trim strip to the first component and orientate the distal edge of the trim strip relative to the first axis such that the distal edge of the trim strip and one of the first and second side edges of the second component substantially align with each other along the first axis.

The present disclosure also provides a method of assembling a door assembly of a vehicle. A door frame including a first side surface and a second side surface opposing the first side surface is provided. A first component is attached to the door frame, with the first component including a first alignment member. A trim strip is molded to a second alignment member to attach the second alignment member to the trim strip, with the trim strip extending to a distal edge. The trim strip is pivoted over the door frame from the second side surface to the first side surface. The second alignment member engages with the first alignment member as the trim strip is pivoted over the door frame to the first side surface to orientate the distal edge of the trim strip relative to the door frame.

The present disclosure provides a vehicle including a vehicle body. The vehicle also includes a first component coupled to the vehicle body, with the first component including a first alignment member. The vehicle further includes a second component attached to the first component. The second component includes a first end and a second end spaced from each other along a first axis. The second component also includes a first side edge and a second side edge spaced from each other along a second axis transverse to the first axis. The vehicle also includes a trim strip extending to a distal edge, with the second component coupled to the trim strip. The vehicle further includes a second alignment member attached to the trim strip. The first and second alignment members engage each other to attach the trim strip to the first component and orientate the distal edge of the trim strip relative to the first axis such that the distal edge of the trim strip and the first side edge of the second component substantially align with each other along the first axis.

The detailed description and the drawings or Figures are supportive and descriptive of the disclosure, but the scope of the disclosure is defined solely by the claims. While some of the best modes and other embodiments for carrying out the claims have been described in detail, various alternative designs and embodiments exist for practicing the disclosure defined in the appended claims.

DETAILED DESCRIPTION

Figure 1:
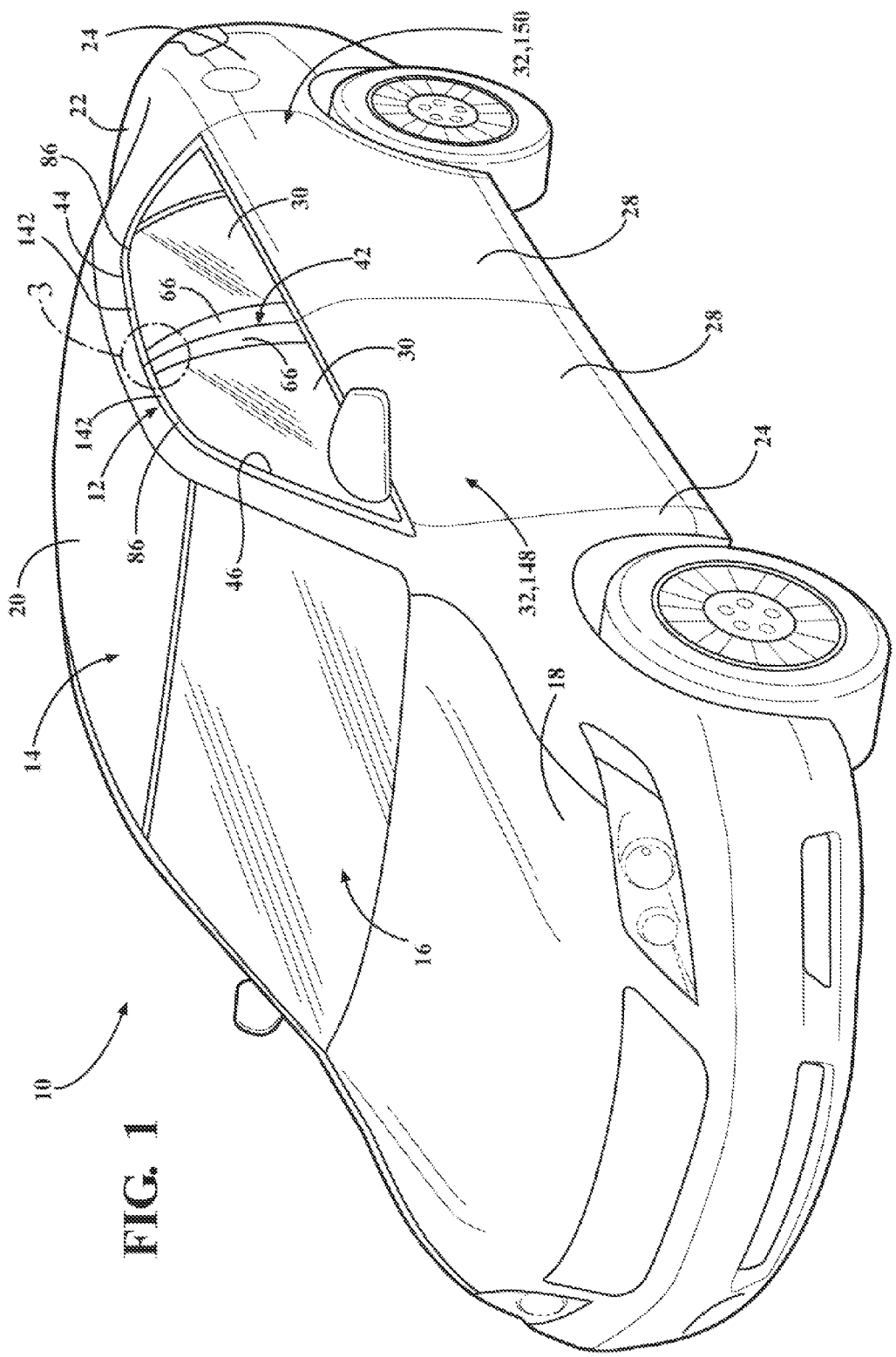
FIG. 1 is a schematic perspective view of a vehicle and a door assembly.

Referring to the Figures, wherein like numerals indicate like or corresponding parts throughout the several views, a vehicle 10 and a door assembly 12 for the vehicle 10 are generally shown in FIG. 1. The vehicle 10 can be a car, a truck, a van or any other suitable vehicle 10.

Referring to FIG. 1, the vehicle 10 includes a vehicle body 14. The vehicle body 14 can surround a vehicle compartment 16. Generally, the vehicle compartment 16 is accessible to a driver and/or one or more passengers. In certain embodiments, the vehicle body 14 can be the general body of the vehicle 10, such as one or more of a hood 18, a roof 20, a trunk 22, one or more quarter panels 24, etc. In other embodiments, the vehicle body 14 can be a vehicle frame which supports the hood 18, the roof 20, the trunk 22, the quarter panels 24, etc., of the vehicle 10.

Generally, the door assembly 12 is coupled to the vehicle body 14 of the vehicle 10. For example, the door assembly 12 can include a door frame 26 (see FIG. 2) coupled to the vehicle body 14. Specifically, turning to FIG. 1, the door frame 26 supports a side panel 28 and a side window 30 to define a door 32. The door 32 is movable relative to the vehicle body 14. Therefore, the door 32 opens and closes to allow the driver/passengers to enter or exit the vehicle compartment 16.

Figure 2:
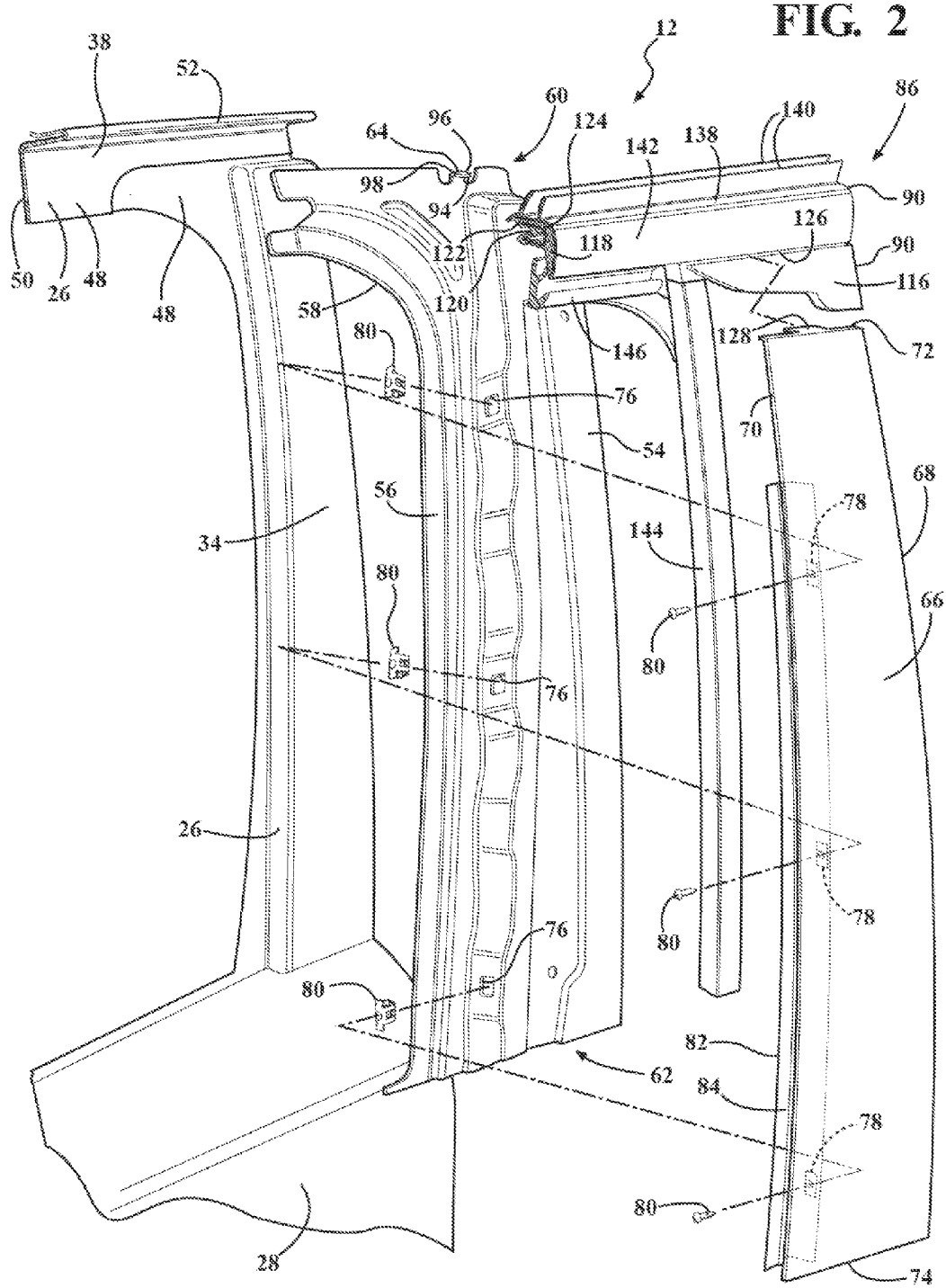
FIG. 2 is a schematic exploded perspective view of the door assembly.
Figure 3:
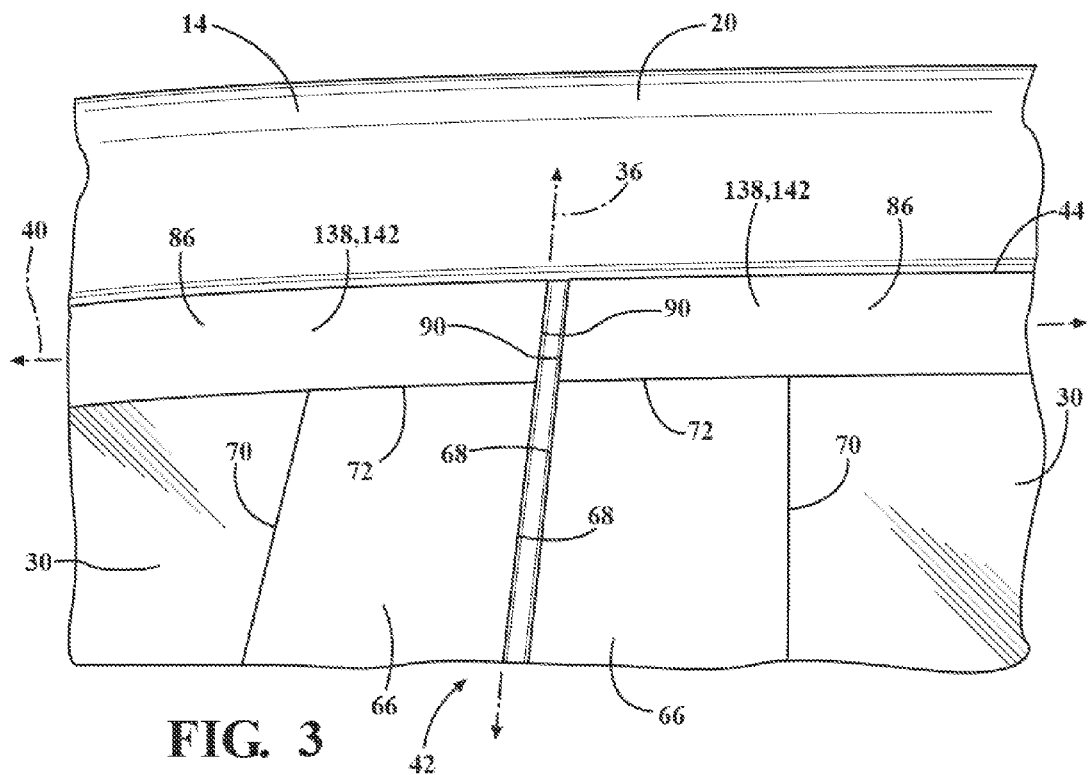
FIG. 3 is a schematic enlarged perspective view of a plurality of trim strips and a plurality of appliqués taken from FIG. 1.

Turning to FIGS. 1-3, the door frame 26 has a first frame section 34 extending along a first axis 36 and a second frame section 38 extending away from the first frame section 34 along a second axis 40 transverse to the first axis 36. In other words, the first frame section 34 extends axially relative to the first axis 36 and the second frame section 38 extends axially relative to the second axis 40. More specifically, the first frame section 34 generally extends between the side panel 28 and the second frame section 38 along the first axis 36. Therefore, the first frame section 34 can extend along a B-pillar 42 of the vehicle 10 and the second frame section 38 can extend along a D-line edge 44 of the vehicle 10 as known to those skilled in the art. The first axis 36 can extend generally vertical and the second axis 40 can extend generally horizontal. In other words, the first axis 36 can extend generally upward and downward. Additionally, the second axis 40 can extend generally forward and backward. In certain embodiments, the first axis 36 can extend angularly vertical and the second axis 40 can extend angularly horizontal. In other embodiments, the first and second axes 36, 40 can extend perpendicular to each other. It is to be appreciated that the position of the first and second axes 36, 40 are shown in FIG. 3 for illustrative purposes and the position of the axes 36, 40 can change.

The first and second frame sections 34, 38 and the side panel 28 cooperate to define an opening 46 for the side window 30. Generally, the side window 30 can move up and down to open and close the opening 46 as desired. Furthermore, the first and second frame sections 34, 38 each include a first side surface 48 and a second side surface 50 opposing the first side surface 48.

Figure 4:
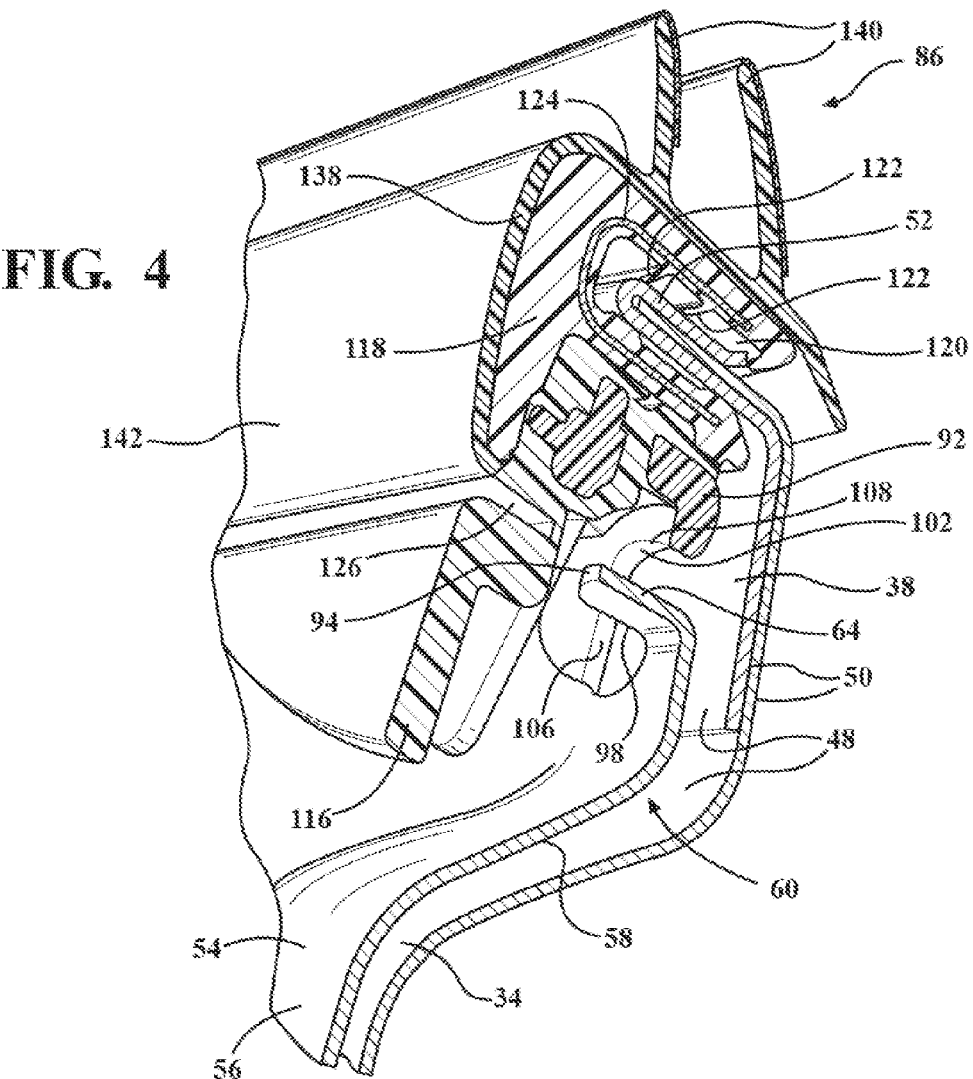
FIG. 4 is a schematic perspective cross-sectional view of the door assembly.

Referring to FIGS. 2 and 4, the second frame section 38 of the door frame 26 can include a door flange 52 extending outwardly away from the second side surface 50. Therefore, the door flange 52 can be disposed along the second frame section 38 adjacent to the D-line edge 44 of the vehicle body 14. As such, generally, the door flange 52 extends along the D-line edge 44 of the vehicle body 14. The door flange 52 will be discussed further below.

As best shown in FIG. 2, the door assembly 12 includes a first component 54. Generally, the first component 54 is coupled to the vehicle body 14. More specifically, the first component 54 can be attached to the door frame 26. The first side surface 48 of each of the first and second frame sections 34, 38 face the first component 54. Therefore, the first component 54 can be attached to the first side surface 48 of the first frame section 34. More specifically, the first component 54 can include a first side 56 and a second side 58 opposing the first side 56, with the second side 58 facing the door frame 26, and more specifically, the second side 58 faces the first frame section 34. As such, the first component 54 is attached to the door frame 26 such that the second side 58 of the first component 54 faces the first side surface 48 of the door frame 26. Therefore, the first component 54 is coupled to the vehicle body 14 through the door frame 26. It is to be appreciated that the first component 54 can be attached to the second frame section 38.

The first component 54 can be an insert attached to the first frame section 34 of the door frame 26. The first component 54 can include a first end portion 60 and a second end portion 62 spaced from each other along the first axis 36. In other words, the first and second end portions 60, 62 are spaced from each other axially relative to the first axis 36. Therefore, in certain embodiments, the first component 54 can be elongated. It is to be appreciated that the first component 54 can be any suitable configuration. Furthermore, the insert can be attached to the second frame section 38.

Continuing with FIG. 2, the first component 54 includes a first alignment member 64. In certain embodiments, the first component 54, and more specifically the insert, is attached to the first frame section 34 of the door frame 26 such that the first alignment member 64 overlaps the second frame section 38. Generally, the first alignment member 64 is disposed on the first end portion 60 of the first component 54. It is to be appreciated that the first alignment member 64 can be in any suitable location.

In certain embodiments, the first component 54 and the first alignment member 64 are formed of one piece. In other words, the first component 54 and the first alignment member 64 are integrally formed to each other. In an alternative embodiment, such as in FIG. 6, the first alignment member 64 can be attached to the first component 54. It is to be appreciated that the first alignment member 64 and the first component 54 can be attached to each other by any suitable methods.

The first component 54 and the first alignment member 64 can be formed of a metal material. In one embodiment, the metal material is steel. In another embodiment, the metal material is an alloy, such as aluminum alloy. It is to be appreciated that the first component 54 and the first alignment member 64 can be formed of any suitable metal and/or non-metal material.

As best shown in FIG. 2, the door assembly 12 further includes a second component 66 attached to the first component 54. Generally, the first side 56 of the first component 54 faces the second component 66. The second component 66 includes a first end 72 and a second end 74 spaced from each other along the first axis 36. In other words, the first and second ends 72, 74 are spaced from each other axially relative to the first axis 36. The second component 66 also includes a first side edge 68 and a second side edge 70 spaced from each other along the second axis 40 transverse to the first axis 36. In other words, the first and second side edges 68, 70 are spaced from each other axially relative to the second axis 40. The second component 66 can be for covering the first frame section 34 and/or the first component 54 to provide an aesthetic appearance when viewing the vehicle 10 from outside of the vehicle compartment 16. In certain embodiments, the second component 66 can be an appliqué as known to those skilled in the art. Therefore, the appliqué can provide an aesthetic appearance. The second component 66 can be any suitable configuration.

As mentioned above, the first and second components 54, 66 are attached to each other. The first component 54 can include one or more first coupling portions 76 and the second component 66 can include one or more second coupling portions 78 cooperating with respective first coupling portions 76. For example, as shown in FIG. 2, one or more fasteners 80 can be utilized to attach the first and second components 54, 66 together. More specifically, the fasteners 80 can be disposed through respective first and second coupling portions 76, 78 to secure or attach the first and second components 54, 66 together. In certain embodiments, the first coupling portions 76 can be holes and the second coupling portions 78 can be holes; therefore, the fasteners 80 can be disposed through the holes of the first and second coupling portions 76, 78 to secure the first and second components 54, 66 together. It is to be appreciated that the first and second components 54, 66 can be attached to each other by any suitable methods.

Continuing with FIG. 2, the second component 66 can include a plate 82 spaced from the first and second side edges 68, 70. Generally, in certain embodiments, the plate 82 is disposed proximal to the second side edge 70. The second component 66 and the plate 82 can define a recess 84 therebetween. The plate 82 can be coupled or attached to the second component 66 such that the plate 82 and the second component 66 cooperate to present the recess 84. Generally, the plate 82 extends along the second axis 40 and is elongated along the first axis 36. In other words, the plate 82 extends axially relative to the second axis 40 and is elongated axially relative to the first axis 36. The plate 82 can include the second coupling portions 78, and more specifically, define the holes. The plate 82 can be any suitable configuration and location.

Turning to FIGS. 2-4, in addition, the door assembly 12 includes a trim strip 86 extending to a distal edge 90. Generally, the trim strip 86 is coupled to the door flange 52 and the second component 66 is coupled to the trim strip 86. Therefore, the trim strip 86 generally extends along the D-line edge 44 of the vehicle body 14. Furthermore, the trim strip 86 can generally extend the entire length of the second frame section 38.

In addition, the trim strip 86 is coupled to the first component 54 through the first alignment member 64. Furthermore, the first and second component 54, 66 are attached to each other as discussed above. Therefore, the trim strip 86 and the second component 66 are each coupled, secured or located to the same part (the first component 54), which reduces tolerance issues.

The distal edge 90 of the trim strip 86 and one of the first and second side edges 68, 70 of the second component 66 substantially align with each other along the first axis 36 which is further discussed below. More specifically, in certain embodiments, the distal edge 90 of the trim strip 86 and the first side edge 68 of the second component 66 substantially align with each other along the first axis 36. For example, the distal edge 90 of the trim strip 86 and the first side edge 68 of the appliqué substantially align with each other along the first axis 36 as best shown in FIG. 3. In other words, the distal edge 90 and the first side edge 68 align in a substantially parallel relationship to each other. Therefore, the distal edge 90 and the first side edge 68 are substantially flush to each other to provide an aesthetic appearance. It is to be appreciated that the trim strip 86 can be referred to as a reveal molding, a weather strip, molding, a seal, etc.

Figure 5:
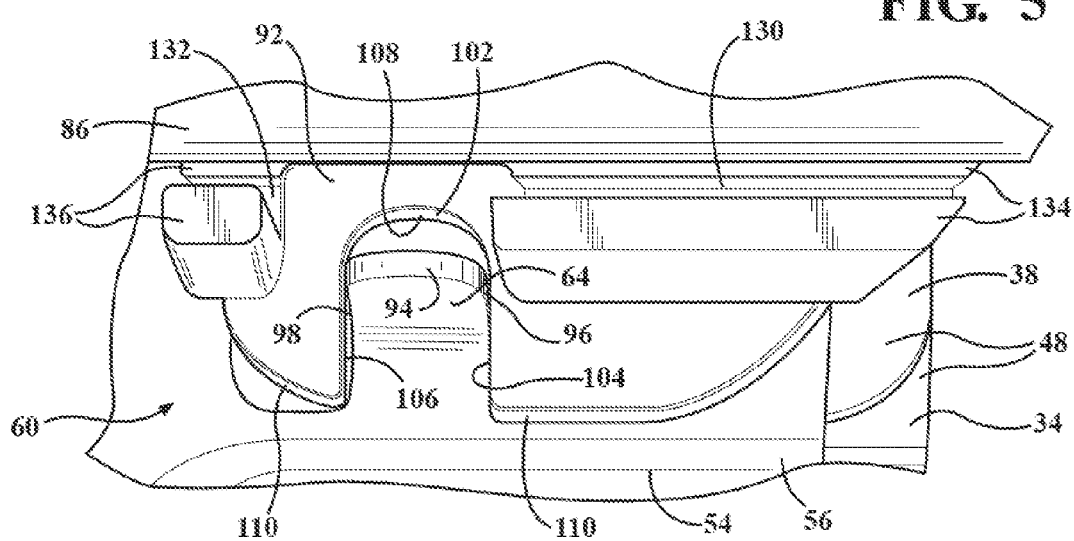
FIG. 5 is a schematic perspective view of a first alignment member and a second alignment member engaging each other, with a portion of the trim strip removed.

Referring to FIGS. 4 and 5, the door assembly 12 further includes a second alignment member 92 attached to the trim strip 86. The first and second alignment members 64, 92 engage each other to attach the trim strip 86 to the first component 54 and orientate the distal edge 90 of the trim strip 86 relative to the first axis 36 such that the distal edge 90 of the trim strip 86 and one of the first and second side edges 68, 70 of the second component 66 substantially align with each other along the first axis 36. In certain embodiments, the first and second alignment members 64, 92 engage each other such that the distal edge 90 of the trim strip 86 and the first side edge 68 of the second component 66 substantially align with each other along the first axis 36 as shown in FIG. 3. Simply stated, the distal edge 90 of the trim strip 86 and the first side edge 68 of the second component 66 substantially align with each other along the first axis 36 to present a flush appearance therealong. Aligning the distal edge 90 of the trim strip 86 and one of the first and second side edges 68, 70, such as the first side edge 68, provides an aesthetic appearance to the vehicle 10. It is to be appreciated that a portion of the trim strip 86 is removed in FIG. 5 for illustrative purposes to show engagement between the first and second alignment members 64, 92.

The second alignment member 92 can be formed of a polymeric material. In certain embodiments, the polymeric material can be a polyamide. One suitable polyamide is nylon. It is to be appreciated that the second alignment member 92 can be formed of any suitable material.

In certain embodiments, as shown in FIGS. 4 and 5, the first alignment member 64 can be an alignment flange extending outwardly away from the second side 58. Simply stated, the alignment flange extends outwardly toward the second component 66 to a distal end 94. Generally, the alignment flange and the second alignment member 92 engage each other to orientate the distal edge 90 of the trim strip 86 relative to the first axis 36. The alignment flange can include a first edge 96 and a second edge 98 spaced from each other along the second axis 40 such that the first edge 96 is disposed proximal to the first side edge 68 of the second component 66 and the second edge 98 is disposed proximal to the second side edge 70 of the second component 66. In other words, the first and second edges 96, 98 are spaced from each other axially relative to the second axis 40. Therefore, the second alignment member 92 engages the first and second edges 96, 98 of the alignment flange to minimize movement of the trim strip 86 along the second axis 40 to orientate the distal edge 90 of the trim strip 86 relative to the first axis 36. Simply stated, the first and second alignment members 64, 92 cooperate to minimize forward and backward movement of the distal edge 90 to provide a consistent location of the distal edge 90 of the trim strip 86, thus decreasing assembly time. Generally, the distal end 94 of the alignment flange is disposed between the first and second edges 96, 98.

Figure 6:
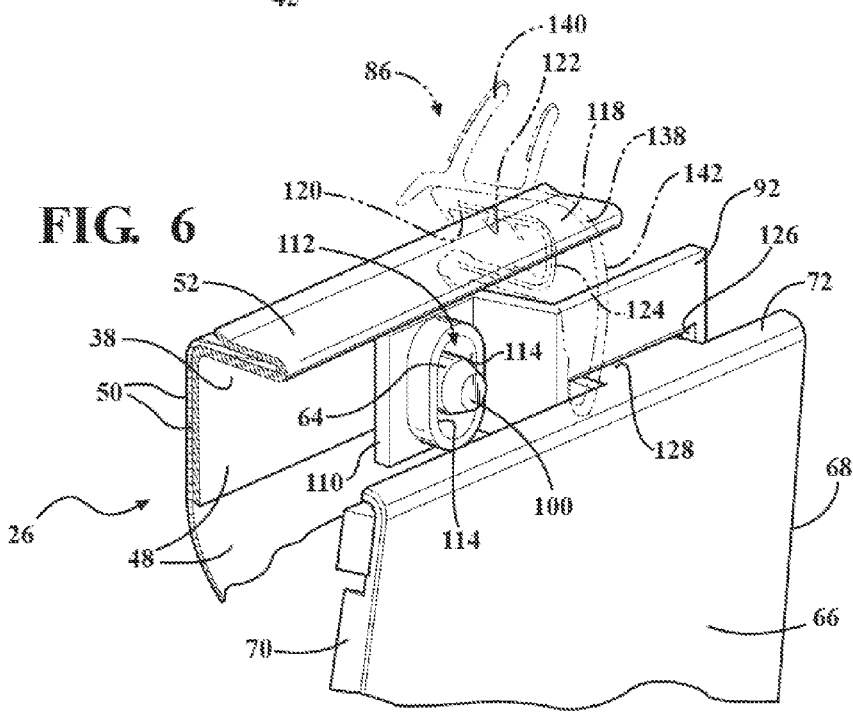
FIG. 6 is a schematic perspective view of another configuration of the first and second alignment members.

In other embodiments, as shown in FIG. 6, the first alignment member 64 is an alignment pin extending outwardly away from the second side 58 to a distal end 100. Generally, the alignment pin and the second alignment member 92 engage each other to orientate the distal edge 90 of the trim strip 86 relative to the first axis 36. The alignment pin can be attached to the first end portion 60 of the first component 54. It is to be appreciated that the alignment pin can be attached to the first component 54 by any suitable methods. Furthermore, it is to be appreciated that, in other embodiments, the alignment pin and the first component 54 can be formed of one piece.

Turning back to FIGS. 4 and 5, the second alignment member 92 can define a cutout 102 extending along the first axis 36 such that the second alignment member 92 presents a first side wall 104, a second side wall 106 facing the first side wall 104 and a third side wall 108 between the first and second side walls 104, 106. In other words, the cutout 102 extends axially relative to the first axis 36. The first, second and third side walls 104, 106, 108 are disposed adjacent to the cutout 102, with the first and second side walls 104, 106 spaced from each other along the second axis 40. In other words, the first and second side walls 104, 106 extend axially relative to the second axis 40. The first side wall 104 and the first edge 96 of the alignment flange engage each other and the second side wall 106 and the second edge 98 of the alignment flange engage each other to minimize movement of the trim strip 86 along the second axis 40 to orientate the distal edge 90 of the trim strip 86 relative to the first axis 36. Therefore, adjustment of the trim strip 86 is minimized when utilizing the first and second alignment members 64, 92, which also reduces installation effort. It is to be appreciated that the alignment flange can be spaced from the third side wall 108 (see FIGS. 4 and 5) or can engage the third side wall 108.

More specifically, in certain embodiments, the second alignment member 92 can include an outer periphery 110, with the cutout 102 extending through the outer periphery 110 to present the first, second and third side walls 104, 106, 108. In other words, the cutout 102 intersects the outer periphery 110.

In other embodiments, as shown in FIG. 6, the second alignment member 92 can define a slit 112 extending along the first axis 36 between the outer periphery 110 such that the second alignment member 92 presents a pair of walls 114 spaced from each other along the second axis 40 such that the walls 114 face each other. In other words, the slit 112 extends axially relative to the first axis 36, and additionally, the slit 112 does not intersect the outer periphery 110. The alignment pin and the walls 114 engage each other to minimize movement of the trim strip 86 along the second axis 40 to orientate the distal edge 90 of the trim strip 86 relative to the first axis 36.

Turning back to FIG. 4, the trim strip 86 can include a first portion 116 and a second portion 118 attached to each other and each can define the distal edge 90. Generally, the second alignment member 92 is attached to the first portion 116 proximal to the distal edge 90. It is to be appreciated that the second alignment member 92 can be attached to the trim strip 86 in any suitable location, and thus can be attached to the first and/or second portions 116, 118. It is to also be appreciated that the first portion 116 does not have to extend the entire length of the second frame section 38. In addition, it is to be appreciated that the portion of the trim strip 86 removed in FIG. 5 (as discussed above) is the first portion 116.

Continuing with FIG. 4, the second portion 118 of the trim strip 86 can define a channel 120 facing the door frame 26. The door flange 52 is disposed in the channel 120 to secure the trim strip 86 to the door frame 26. Engaging the first and second alignment members 64, 92 to each other orientates the distal edge 90 of the trim strip 86 relative to the first axis 36, which also minimizes adjusting of the trim strip 86, and thus minimizes deformation of the channel 120. The second portion 118 can include at least one first lip 122 extending into the channel 120 to engage the door flange 52. In certain embodiments, a plurality of first lips 122 can extend from the second portion 118 into the channel 120 to engage the door flange 52. Generally, the first lips 122 are spaced from each other as shown in FIG. 4.

Furthermore, the second portion 118 of the trim strip 86 can include a reinforcement member 124. The reinforcement member 124 can be complementary to the configuration of the channel 120, and can be embedded in the trim strip 86. Therefore, the reinforcement member 124 assists in supporting the trim strip 86 on the door flange 52. It is to be appreciated that the reinforcement member 124 can be any suitable configuration and material.

Continuing with FIG. 4, in certain embodiments, the trim strip 86 can define a slot 126. More specifically, the first portion 116 of the trim strip 86 can define the slot 126 facing the second component 66 such that the slot 126 and the channel 120 face in opposite directions. Furthermore, the first end 72 of the second component 66 can include a projection 128 (see FIG. 2) extending outwardly toward the door frame 26. The projection 128 is disposed in the slot 126 to orientate the first and second side edges 96, 70 of the second component 66 relative to the first axis 36 such that the distal edge 90 of the trim strip 86 and the first side edge 68 of the second component 66 substantially align with each other along the first axis 36. In other words, the projection 128 engages the slot 126.

It is to be appreciated that the slot 126 can be any suitable configuration, and FIG. 6 illustrates another example of a suitable configuration of the slot 126 defined in the second alignment member 92. In FIG. 6, the trim strip 86 is shown in phantom lines to illustrate the walls 114 and the alignment pin engaging each other, as well as to illustrate the slot 126. Therefore, it is to be appreciated that the trim strip 86 and the second alignment member 92 of FIG. 6 are attached to each other, and in certain embodiments, the second alignment member 92 and the second portion 118 of the trim strip 86 are attached to each other. It is to also be appreciated that in FIG. 6, the first portion 116 can be eliminated; therefore, the projection 128 of the second component 66 can engage the slot 126 of the second alignment member 92. In other words, the projection 128 can directly engage the slot 126 of the second component 66. As such, the second alignment member 92 can also support the second component 66.

Turning back to FIG. 5, furthermore, the second alignment member 92 can define a first groove 130 and a second groove 132 spaced from each other along the second axis 40. In other words, the first and second grooves 130, 132 are spaced from each other axially relative to the second axis 40. The first and second grooves 130, 132 face the second component 66. Therefore, the first and second grooves 130, 132 and the channel 120 face in opposite directions. In certain embodiments, the cutout 102 is disposed between the first and second grooves 130, 132. The first and second grooves 130, 132 substantially align with each other along the second axis 40. The slot 126 of the trim strip 86 can be disposed in the first and/or second grooves 130, 132. Therefore, the projection 128 can also be disposed in the first and/or second grooves 130, 132. As such, the second alignment member 92 can also support the second component 66.

Continuing with FIG. 5, the second alignment member 92 can include a first protrusion 134 and a second protrusion 136 spaced from each other and extending outwardly toward the second component 66. Generally, the cutout 102 is disposed between the first and second protrusions 134, 136. The first protrusion 134 defines the first groove 130 and the second protrusion 136 defines the second groove 132. As discussed above, the first and second grooves 130, 132 substantially align with each other along the second axis 40.

Referring to FIG. 4, the trim strip 86 can also include a third portion 138 attached to at least one of the first and second portions 116, 118. In certain embodiments, the third portion 138 is attached to the second portion 118. The third portion 138 can include at least one second lip 140 extending outwardly away from the second portion 118. In certain embodiments, a plurality of second lips 140 can extend from the third portion 138 away from the second portion 118. Generally, one or more of the second lips 140 engage the vehicle body 14 when the door 32 is closed.

Furthermore, the trim strip 86 can present a show surface 142 (see FIGS. 1-4) facing away from the door frame 26. In other words, the show surface 142 is visible from outside of the vehicle 10. Generally, the show surface 142 extends along the D-line edge 44 of the vehicle 10. More specifically, at least one of the second and third portions 118, 138 can present the show surface 142. In certain embodiments, the third portion 138 presents the show surface 142.

In certain embodiments, the first, second and third portions 116, 118, 138 are attached to each other by molding. Furthermore, the second alignment member 92 can be attached to the trim strip 86 by molding the first portion 116 to the second alignment member 92. Alternatively, as shown in FIG. 6, the second and third portions 118, 138 are attached to each other by molding, and the second alignment member 92 can be attached to the trim strip 86 by molding the second portion 118 to the second alignment member 92. The first, second and third portions 116, 118, 138 can be injection molded or extruded. It is to be appreciated that the third portion 138 can be attached to the first and/or second portions 116, 118. In addition, it is to be appreciated that the first, second and third portions 116, 118, 138 can be any suitable configuration and one or more of these portions 116, 118, 138 can be eliminated.

The first, second and third portions 116, 118, 138 can be formed of an elastomer. In one embodiment, the elastomer is rubber. The first, second and third portions 116, 118, 138 can be formed of different elastomers or the same elastomers. For example, the first, second and third portions 116, 118, 138 can be formed of different rubbers. The different rubbers can have different properties, such as harness, resiliency, tackiness, color, etc. It is to be appreciated that the first, second and third portions 116, 118, 138 can be formed of any suitable elastomer or material.

Turning to FIG. 2, a first strip 144 can be attached to at least one of the trim strip 86 and the door frame 26. The first strip 144 generally extends along the first axis 36 adjacent to the opening 46 of the door 32. In other words, the first strip 144 extends axially relative to the first axis 36 and the first strip 144 is disposed between the first frame section 34 and the second component 66 or appliqué. The side window 30 can engage or move relative to the first strip 144. The first strip 144 can be attached to at least one of the first, second and third portions 116, 118, 138 of the trim strip 86. In one embodiment, the first strip 144 is attached to the first portion 116 (see FIG. 2). In other embodiments, the first strip 144 is attached to the first frame section 34. Furthermore, in certain embodiments, the first strip 144 is attached to the trim strip 86 and the door frame 26. The first strip 144 can be a trim piece, a weather strip, a seal, molding, etc. The first strip 144 can be attached to the trim strip 86 and/or the door frame 26 by any suitable methods, such as, for example, molding, adhesive, fasteners, etc.

Continuing with FIG. 2, a second strip 146 can be attached to at least one of the trim strip 86 and the door frame 26. The second strip 146 generally extends along the second axis 40 adjacent to the opening 46 of the door 32. In other words, the second strip 146 extends axially relative to the second axis 40. The side window 30 can engage or move relative to the second strip 146, when the side window 30 closes the opening 46, the second strip 146 minimizes fluid or particles from entering the vehicle compartment 16. Therefore, when the side window 30 is closed, the second strip 146 is disposed between the side window 30 and the door frame 26. More specifically, when the side window 30 is closed, the second strip 146 is disposed between the side window 30 and the second frame section 38. The second strip 146 can be attached to at least one of the first, second and third portions 116, 118, 138 of the trim strip 86. In certain embodiments, the second strip 146 is attached to the second and/or third portions 118, 138. In other embodiments, the second strip 146 is attached to the second frame section 38. Furthermore, in certain embodiments, the second strip 146 is attached to the trim strip 86 and the door frame 26. The second strip 146 can be a trim piece, a weather strip, a seal, molding, etc. The second strip 146 can be attached to the trim strip 86 and/or the door frame 26 by any suitable methods, such as, for example, molding, adhesive, fasteners, etc.

As mentioned above, the first alignment member 64 and the first component 54 can be formed of one piece. Therefore, in certain embodiments, the first end portion 60 of the first component 54 can be cut to form the first alignment member 64, and more specifically, form the alignment flange. Generally, the first end portion 60 is cut with the material forming the first alignment member 64 being flat or straight. As such, when the first end portion 60 is cut, the first alignment member 64 is straight. Therefore, after cutting, the first alignment member 64 is bent such that the first alignment member 64 extends outwardly away from the second side 58 of the first component 54. In other words, the first alignment member 64 is bent such that the distal end 94 faces the second component 66.

The first alignment member 64 can be die cut, stamped, punched or formed from any suitable method. Therefore, for example, a die can be mounted to a platform. The die defines a pattern of the first alignment member 64 when the first alignment member 64 is straight. A cutter is attached to a movable platform and aligns with the pattern. The cutter is configured to be complementary to the pattern and moves to engage the first end portion 60. Therefore, the first end portion 60 is disposed between the die and the cutter such that the cutter engages the first end portion 60 to form the first alignment member 64. As such, the cutter and the die cooperate to form the first alignment member 64.

The die and the cutter can be adjusted to change the location of the first alignment member 64 such that the first component 54 can be utilized on different vehicles 10. For example, the die and the cutter can be adjusted toward the first side edge 68 of the first component 54 to move the first alignment member 64 toward the first side edge 68. As another example, the die and the cutter can be adjusted toward the second side edge 70 to move the first alignment member 64 toward the second side edge 70. In other words, the first alignment member 64 can be adjusted left or right as desired by adjusting the position of the die and the cutter.

The first and second alignment members 64, 92 can be utilized for any door 32 of the vehicle 10. Furthermore, a plurality of first and second alignment members 64, 92 can be utilized such that one of the first and second alignment members 64, 92 are utilized for one door 32, another one of the first and second alignment members 64, 92 are utilized for another door 32, and so on. Therefore, a plurality of door frames 26, a plurality of first and second components 54, 66, a plurality of trim strips 86, etc. can be utilized. For illustrative purposes only, in FIGS. 1 and 2, various features of two door assemblies 12 are identified, i.e., one assembly 12 for a front door 148 and another assembly 12 for a back door 150. As best shown in FIG. 2, the distal edges 90 of the trim strips 86 for each door assembly 12 align with each other along the second axis 40. Furthermore, the distal edge 90 of one trim strip 86 aligns with the first side edge 68 of one appliqué along the first axis 36 and the distal edge 90 of the other trim strip 86 aligns with the first side edge 68 of the other appliqué along the first axis 36. Therefore, the distal edges 90 and the respective first side edges 68 cooperate to provide an aesthetic appearance.

Figure 7:
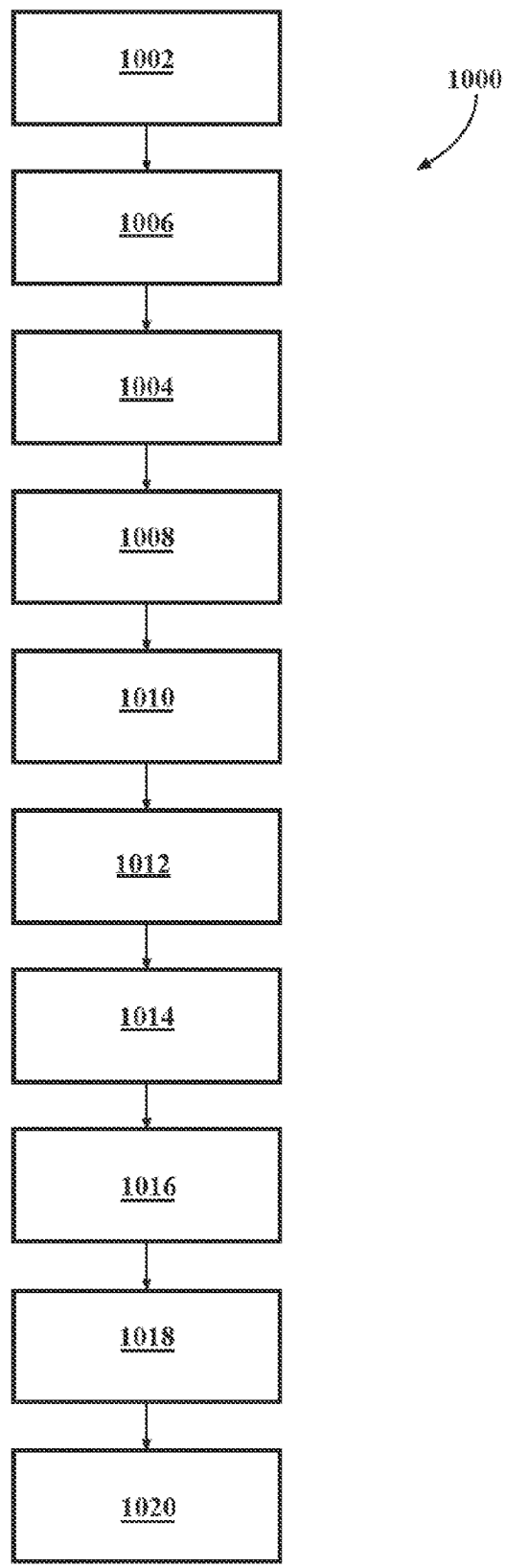
FIG. 7 is schematic flowchart of a method of assembling the door assembly of the vehicle of FIG. 1.

Turning to the flow chart of FIG. 7, the present disclosure also provides a method 1000 of assembling the door assembly 12 of the vehicle 10. The method 1000 includes providing 1002 the door frame 26. The door frame 26 can generally include the first side surface 48 and the second side surface 50 opposing the first side surface 48 as discussed above. More specifically, providing 1002 the door frame 26 can include providing the first and second frame sections 34, 38.

The method 1000 also includes attaching 1004 the first component 54 to the door frame 26, with the first component 54 including the first alignment member 64. The method 1000 can further include forming 1006 the first alignment member 64 and the first component 54 of one piece. Generally, forming 1006 the first alignment member 64 occurs before attaching 1004 the first component 54 to the door frame 26. It is to be appreciated that the first alignment member 64 and the first component 54 can be attached to each other instead of being formed of one piece.

In addition, the method 1000 includes molding 1008 the trim strip 86 to the second alignment member 92 to attach the second alignment member 92 to the trim strip 86. As discussed above, the trim strip 86 extends to the distal edge 90. More specifically, the first, second and third portions 116, 118, 138 of the trim strip 86 can be molded together. In certain embodiments, the first portion 116 is molded to the second alignment member 92 to attach the second alignment member 92 to the trim strip 86. It is to be appreciated that the first, second and/or third portions 116, 118, 138 can be molded to the second alignment member 92.

The method 1000 also includes pivoting 1010 the trim strip 86 over the door frame 26 from the second side surface 50 to the first side surface 48 and engaging 1012 the second alignment member 92 with the first alignment member 64 as the trim strip 86 is pivoted over the door frame 26 to the first side surface 48 to orientate the distal edge 90 of the trim strip 86 relative to the door frame 26. Simply stated, the trim strip 86 can be pivoted or rotated over the door frame 26 from the second side surface 50 to the first side surface 48. Assembling the trim strip 86 to the door frame 26 in this manner reduces installation effort. Generally, attaching 1004 the first component 54 to the door frame 26 occurs before pivoting 1010 the trim strip 86 over the door frame 26.

Furthermore, the method 1000 can include attaching 1014 the trim strip 86 to the door flange 52 as the trim strip 86 is pivoted over the door frame 26 from the second side surface 50 to the first side surface 48 to secure the trim strip 86 to the door frame 26. More specifically, attaching 1014 the trim strip 86 to the door flange 52 can include disposing the door flange 52 in the channel 120 as the trim strip 86 is pivoted over the door frame 26 such that the first lips 122 engage the door flange 52.

The method 1000 can further include coupling 1016 the second component 66 to the trim strip 86. As discussed above, the second component 66 can include the first side edge 68 and the second side edge 70 spaced from each other along the second axis 40 traverse to the first axis 36. Furthermore, the second component 66 can include the first end 72 and the second end 74 spaced from each other along the first axis 36 transverse to the second axis 40. Generally, coupling 1016 the second component 66 to the trim strip 86 occurs after pivoting 1010 the trim strip 86 over the door frame 26. Coupling 1016 the second component 66 to the trim strip 86 can include engaging the second component 66 with the trim strip 86. More specifically, engaging the second component 66 with the trim strip 86 can include inserting the projection 128 of the second component 66 into the slot 126 of the trim strip 86.

Furthermore, the method 1000 can include attaching 1018 the first and second components 54, 66 to each other. Attaching 1018 the first and second components 54, 66 to each other occurs after pivoting 1010 the trim strip 86 over the door frame 26.

The method 1000 can also include aligning 1020 the distal edge 90 of the trim strip 86 and the first side edge 68 of the second component 66 along the first axis 36 when the second component 66 engages the trim strip 86. Aligning 1020 the distal edge 90 of the trim strip 86 with the first side edge 68 of the second component 66 occurs when coupling 1016 the second component 66 to the trim strip 86.

As discussed above, the first alignment member 64 can be the alignment flange including the first edge 96 and the second edge 98 spaced from each other. As also discussed above, the second alignment member 92 defines the cutout 102 such that the second alignment member 92 presents the first side wall 104, the second side wall 106 facing the first side wall 104 and the third side wall 108 between the first and second side walls 104, 106. Therefore, engaging 1012 the second alignment member 92 with the first alignment member 64 can include engaging the first side wall 104 of the second alignment member 92 with the first edge 96 of the alignment flange and engaging the second side wall 106 of the second alignment member 92 with the second edge 98 of the alignment flange. Engaging the first side wall 104 with the first edge 96 and engaging the second side wall 106 with the second edge 98 minimizes movement of the trim strip 86 along the second axis 40 to orientate the distal edge 90 of the trim strip 86 relative to the first axis 36. When the second component 66 is coupled to the trim strip 86, the distal edge 90 of the trim strip 86 and the first side edge 68 of the second component 66 align along the first axis 36 to present an aesthetic appearance. Generally, engaging 1012 the second alignment member 92 with the first alignment member 64 occurs before coupling 1016 the second component 66 to the trim strip 86.

It is to be appreciated that the order or sequence of performing the method 1000 as identified in the flowchart of FIG. 7 is for illustrative purposes and other orders or sequences are within the scope of the present disclosure. It is to also be appreciated that the method 1000 can include other features not specifically identified in the flowchart of FIG. 7. It is to further be appreciated that the directional reference in the specification (for example: forward, backward, left, right, etc.) is for illustrative purposes only, and those skilled in the art will recognize that these terms are used descriptively for the Figures, and do not represent limitations on the scope of the disclosure, as defined by the appended claims.

While the best modes for carrying out the disclosure have been described in detail, those familiar with the art to which this disclosure relates will recognize various alternative designs and embodiments for practicing the disclosure within the scope of the appended claims.

The invention claimed is:

1. A door assembly for a vehicle, the assembly comprising:
a first component including a first alignment member;
a second component attached to the first component, with the second component including a first end and a second end spaced from each other along a first axis, and with the second component including a first side edge and a second side edge spaced from each other along a second axis transverse to the first axis;
a trim strip extending to a distal edge, with the second component coupled to the trim strip; and
a second alignment member attached to the trim strip, with the first and second alignment members engaging each other to attach the trim strip to the first component and orientate the distal edge of the trim strip relative to the first axis such that the distal edge of the trim strip and one of the first and second side edges of the second component substantially align with each other along the first axis.

2. An assembly as set forth in claim 1 wherein the first component includes a first side facing the second component and a second side opposing the first side, and wherein the first alignment member is an alignment flange extending outwardly away from the second side.

3. An assembly as set forth in claim 2 wherein the alignment flange includes a first edge and a second edge spaced from each other along the second axis such that the first edge is disposed proximal to the first side edge of the second component and the second edge is disposed proximal to the second side edge of the second component.

4. An assembly as set forth in claim 3 wherein the second alignment member defines a cutout extending along the first axis such that the second alignment member presents a first side wall, a second side wall facing the first side wall and a third side wall between the first and second side walls, with the first side wall and the first edge of the alignment flange engaging each other and the second side wall and the second edge of the alignment flange engaging each other to minimize movement of the trim strip along the second axis to orientate the distal edge of the trim strip relative to the first axis.

5. An assembly as set forth in claim 4 wherein the second alignment member includes an outer periphery, with the cutout extending through the outer periphery to present the first, second and third side walls.

6. An assembly as set forth in claim 4 wherein the trim strip defines a slot and the first end of the second component includes a projection disposed in the slot to orientate the first and second side edges of the second component relative to the first axis such that the distal edge of the trim strip and the first side edge of the second component substantially align with each other along the first axis.

7. An assembly as set forth in claim 1 further including a door frame having a first frame section extending along the first axis and a second frame section extending away from the first frame section along the second axis.

8. An assembly as set forth in claim 7 wherein the first component is an insert attached to the first frame section of the door frame such that the first alignment member overlaps the second frame section.

9. An assembly as set forth in claim 7 wherein the first and second frame sections each include a first side surface facing the first component and a second side surface opposing the first side surface, with the first component attached to the first side surface of the first frame section.

10. An assembly as set forth in claim 9 wherein the second frame section of the door frame includes a door flange extending outwardly away from the second side surface.

11. An assembly as set forth in claim 10 wherein the trim strip includes a first portion and a second portion attached to each other and each defining the distal edge, with the second alignment member attached to the first portion proximal to the distal edge.

12. An assembly as set forth in claim 11 wherein the second portion of the trim strip defines a channel facing the door frame, with the door flange disposed in the channel to secure the trim strip to the door frame.

13. An assembly as set forth in claim 12 wherein the first portion of the trim strip defines a slot facing the second component such that the slot and the channel face in opposite directions, with the first end of the second component including a projection disposed in the slot to orientate the first and second side edges of the second component relative to the first axis such that the distal edge of the trim strip and the first side edge of the second component substantially align with each other along the first axis.

14. An assembly as set forth in claim 1 wherein the second component is an appliqué, with the distal edge of the trim strip and the first side edge of the appliqué substantially aligning with each other along the first axis.

15. An assembly as set forth in claim 1 wherein the first component and the first alignment member are formed of one piece.

16. A vehicle comprising:
a vehicle body;
a first component coupled to the vehicle body, with the first component including a first alignment member;
a second component attached to the first component, with the second component including a first end and a second end spaced from each other along a first axis, and with the second component including a first side edge and a second side edge spaced from each other along a second axis transverse to the first axis;
a trim strip extending to a distal edge, with the second component coupled to the trim strip, with the trim strip including a show surface visible from outside of the vehicle; and
a second alignment member attached to the trim strip, with the first and second alignment members engaging each other to attach the trim strip to the first component and orientate the distal edge of the trim strip relative to the first axis such that the distal edge of the trim strip and the first side edge of the second component substantially align with each other along the first axis.

* * * * *